(12) United States Patent
Gourlay et al.

(10) Patent No.: US 10,484,256 B2
(45) Date of Patent: Nov. 19, 2019

(54) METHOD AND SYSTEM FOR MONITORING AND CORRECTING DEFECTS OF A NETWORK DEVICE

(71) Applicant: Arista Networks, Inc., Santa Clara, CA (US)

(72) Inventors: Douglas Alan Gourlay, San Francisco, CA (US); Kenneth James Duda, Santa Clara, CA (US); Andre Henri Joseph Pech, San Francisco, CA (US)

(73) Assignee: Arista Networks, Inc., Santa Clara, CA (US)

( * ) Notice: Subject to any disclaimer, the term of this patent is extended or adjusted under 35 U.S.C. 154(b) by 822 days.

(21) Appl. No.: 14/457,585

(22) Filed: Aug. 12, 2014

(65) Prior Publication Data
US 2016/0048420 A1 Feb. 18, 2016

(51) Int. Cl.
*H04L 12/26* (2006.01)
*G06F 11/22* (2006.01)
(Continued)

(52) U.S. Cl.
CPC ...... *H04L 43/0823* (2013.01); *G06F 11/2257* (2013.01); *H04L 41/0681* (2013.01);
(Continued)

(58) Field of Classification Search
CPC .......... G06F 11/0748; G06F 11/0793; G06F 11/2247; G06F 11/2257; G06F 11/2289; G06F 11/2294; G06F 8/60; G06F 8/65; G06F 8/70; G06F 8/71; H04L 41/0813; H04L 41/0816; H04L 41/0823; H04L 41/0836; H04L 41/0866; H04L 41/0869; H04L 41/0631; H04L 67/34; G06Q 10/20; G06Q 30/014; G06Q 30/016
See application file for complete search history.

(56) References Cited

U.S. PATENT DOCUMENTS 5,790,780 A * 8/1998 Brichta ............... G06F 11/2205
714/40
6,029,258 A * 2/2000 Ahmad ................. G06F 11/366
714/26
(Continued)

*Primary Examiner* — Gabriel Chu
(74) *Attorney, Agent, or Firm* — Chamberlain, Hrdlicka, White, Williams & Aughrty

(57) ABSTRACT

A method for determining that a defect applies to a network device that includes receiving, at a monitoring module, network device information from the network device. The network device information includes state information for the network device and does not include hardware and software version information. The method includes storing, in a network device database, the network device information from the network device and receiving, at the monitoring module, defect information about a defect. The defect information includes network device criteria specifying what state information is required for a network device to be affected by the defect. The method includes storing the defect information in a defect database, determining that the defect applies to the network device based on analyzing the network device information and the defect information from their respective databases, and, based on the determination, informing a defect alert recipient that the defect applies to the network device.

28 Claims, 9 Drawing Sheets

(51) Int. Cl.
*H04L 12/24* (2006.01)
*G06Q 30/00* (2012.01)

(52) U.S. Cl.
CPC ........ *H04L 41/507* (2013.01); *H04L 43/0817* (2013.01); *G06Q 30/014* (2013.01)

(56) References Cited

U.S. PATENT DOCUMENTS

| | | | | |
|---|---|---|---|---|
| 6,321,348 | B1* | 11/2001 | Kobata | G06F 8/60 709/203 |
| 6,363,524 | B1* | 3/2002 | Loy | G06F 8/65 717/127 |
| 2002/0116665 | A1* | 8/2002 | Pickover | G06F 8/66 714/38.14 |
| 2004/0153823 | A1* | 8/2004 | Ansari | G06F 11/0715 714/38.14 |
| 2006/0150031 | A1* | 7/2006 | Asauchi | H04L 41/5064 714/46 |
| 2006/0217111 | A1* | 9/2006 | Marolia | G06F 8/65 455/418 |
| 2006/0265630 | A1* | 11/2006 | Alberti | G06F 8/65 714/38.12 |
| 2007/0050678 | A1* | 3/2007 | Estes | G06F 11/0793 714/38.1 |
| 2007/0157192 | A1* | 7/2007 | Hoefler | G06F 8/65 717/168 |
| 2008/0109683 | A1* | 5/2008 | Erwin | G06F 11/079 714/46 |
| 2008/0155360 | A1* | 6/2008 | Bates | G06F 11/362 714/57 |
| 2009/0150716 | A1* | 6/2009 | Akiyama | G06F 11/0736 714/4.1 |
| 2010/0146325 | A1* | 6/2010 | John | G06F 11/0748 714/3 |
| 2010/0306600 | A1* | 12/2010 | Shinboku | G06F 11/0775 714/48 |
| 2013/0159989 | A1* | 6/2013 | Deckert | G06F 8/61 717/172 |
| 2014/0289551 | A1* | 9/2014 | Balakrishnan | G06F 11/004 714/2 |
| 2015/0178063 | A1* | 6/2015 | Narkinsky | G06F 8/68 717/168 |

* cited by examiner

METHOD AND SYSTEM FOR MONITORING AND CORRECTING DEFECTS OF A NETWORK DEVICE

BACKGROUND

Network devices include hardware and software. During the course of operation, defects may occur in the hardware or software that affect network devices. These defects must be identified and corrected to ensure proper functioning of the network devices.

SUMMARY

In general, in one aspect, the invention relates to a method for determining that a defect applies to a network device that includes receiving, at a monitoring module, network device information from the network device. The network device information includes state information for the network device and does not include hardware and software version information. The method also includes storing, in a network device database, the network device information from the network device and receiving, at the monitoring module, defect information about a defect. The defect information includes network device criteria specifying what state information is required for a network device to be affected by the defect. Additionally, the method includes storing the defect information in a defect database, determining that the defect applies to the network device based on analyzing the network device information in the network device database and the defect information in the defect database, and, based on the determination, informing a defect alert recipient that the defect applies to the network device.

In general, in one aspect, the invention relates to a defect monitoring system that includes a defect database that includes a defect entry for a defect. The defect entry includes defect information. The defect monitoring system also includes a network device database that includes a network device entry for a network device. The network device entry comprises network device information. Additionally, the defect monitoring system includes a monitoring module operatively connected to the network device and to a defect alert recipient that includes functionality to receive the network device information from the network device. The network device information includes state information for the network device. State information does not comprise hardware and software version information. The monitoring module of the defect monitoring system also includes functionality to store in the network device database the network device information from the network device and determine that the defect applies to the network device based on analyzing the network device information in the network device database and the defect information in the defect database. The defect information includes network device criteria specifying what state information is required for a network device to be affected by the defect. The monitoring module of the defect monitoring system further includes functionality to, based on the determination, inform the defect alert recipient that the defect applies to the network device.

In general, in one aspect, the invention relates to a non-transitory computer readable medium that includes instructions, which when executed by a processor perform a method that includes receiving, at a monitoring module, network device information from the network device. The network device information includes state information for the network device. State information does not include hardware and software version information. The non-transitory computer readable medium also includes instructions for storing, in a network device database, the network device information from the network device and receiving, at the monitoring module, defect information about a defect. The defect information includes network device criteria specifying what state information is required for a network device to be affect by the defect. The non-transitory computer readable medium includes further instructions for storing the defect information in a defect database, determining that the defect applies to the network device based on analyzing the network device information in the network device database and the defect information in the defect database, and, based on the determination, informing a defect alert recipient that the defect applies to the network device.

In general, in one aspect, the invention relates to a method for determining that a defect applies to a network device that includes receiving, at an internal monitoring module, network device information from the network device. The network device information includes state information for the network device. State information does not include hardware and software version information. The method also includes storing, in a network device database, the network device information from the network device and receiving, at the internal monitoring module, defect information about a defect from an external monitoring module. The defect information includes network device criteria specifying what state information is required for a network device to be affect by the defect. Additionally, the method includes storing the defect information in an internal defect database, determining that the defect applies to the network device based on analyzing the network device information in the network device database and the defect information in the defect database, and, based on the determination, informing a defect alert recipient that the defect applies to the network device.

Other aspects of the invention will be apparent from the following description and the appended claims.

DETAILED DESCRIPTION

Figure 1:
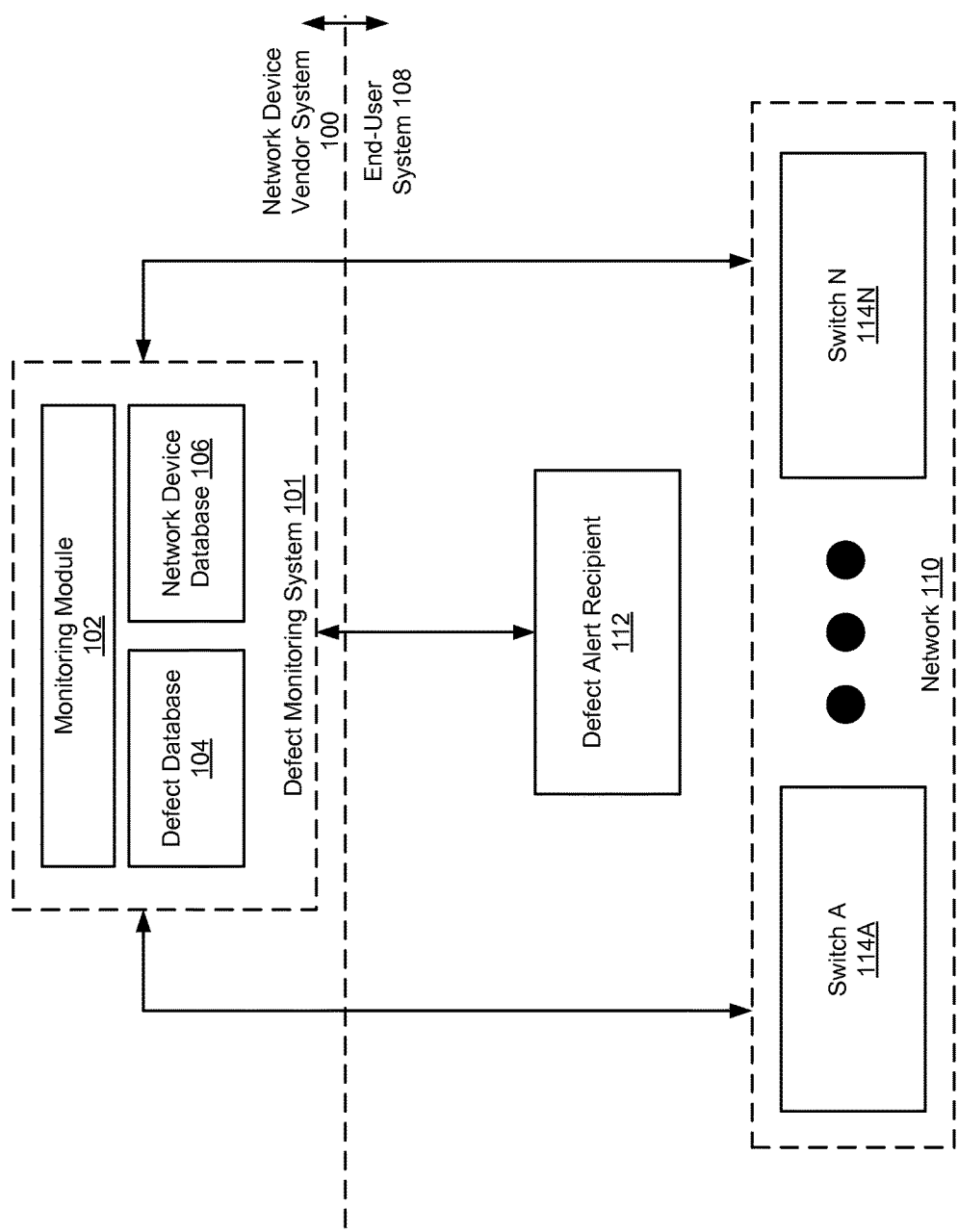
FIG. 1 shows a system in accordance with one or more embodiments of the invention.

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-7, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to determining that a defect potentially affects a network device and providing information related to a solution for the defect to an end-user of the network device. More specifically, in one or more embodiments of the invention, a defect monitoring system includes information about defects, information about network devices, functionality to determine if a defect may affect a network device, and functionality to inform a defect alert recipient that the defect may apply to the network device and provide information relating to the solution for the defect. Also, in one or more embodiments of the invention, the invention includes functionality to, by way of analyzing the state information of the network device, identify and inform a defect alert recipient about defects that affect network devices constructed from the same hardware parts and executing the same software, but whose state information (e.g., number of routing table entries) differs, and where the difference in state information determines if the defect affects the network device. Additionally, in one or more embodiments of the invention, the defect monitoring includes functionality to implement the solution to the defect.

The following description describes embodiments of the invention in which the network devices are switches in a data center collectively referred to as an end-user system. However, the invention is not limited to switches; rather embodiments of the invention may be extended to enable defect detection and/or correction for other network devices, such as routers, provided that such network devices are able to send network device information to the defect monitoring system (described below). Also, embodiments of the invention are not limited to network devices in a data center; rather embodiments of the invention may be extended to environments other than a data center in which network devices operate.

FIG. 1 shows a system in accordance with one or more embodiments of the invention. In one embodiment of the invention, the system includes a network device vendor system (100) and an end-user system (108). The network device vendor system may include a defect monitoring system (101) which includes a monitoring module (102), a defect database (104), and a network device database (106). The end-user system may include a defect alert recipient (112) and a network (110) that includes one or more switches (114A-114N). Each of these components is described below.

In one embodiment of the invention, the end-user system (108) is a collection of devices acquired by an end-user that are connected to one another via a network (110). In one embodiment of the invention, the network (110) includes switches (114A-114N) and network devices connected to the switches (not shown). A switch is a physical device that includes persistent storage, memory (e.g., Random Access Memory), one or more processors, and two or more physical ports. Each port may or may not be connected to another device on a network (e.g., a server, a switch, a router, etc.). Each switch (114A-114N) is configured to receive packets via the ports and determine whether to (i) drop the packet, (ii) process the packet in accordance with one or more embodiments of the invention, or (iii) send the packet out another port on the network device. How the switch makes the determination of whether to drop the packet or send the packet to another device on the network depends, in part, on whether the switch is a layer-2 (L2) switch or a layer-3 (L3) switch (also referred to as a multilayer switch). If the switch is operating as a L2 switch, the switch uses the destination Media Access Control (MAC) address along with a forwarding table to determine out of which port to send the packet. If the switch is operating as a L3 switch, the switch uses the destination Internet Protocol (IP) address along with a routing table to determine out of which port to send the packet. If the switch is a multilayer switch, the multilayer switch includes functionality to process packets using both MAC addresses and IP addresses.

In addition to the functionality described above, the switches (114A-114N) may include functionality to obtain and store switch information in their persistent storage. In one embodiment of the invention, the switches (114A-114N) are operatively connected to the defect monitoring system (101) of the network device vendor system (100) and include functionality to send the switch information to the monitoring module (102) of the defect monitoring system (101). Switch information is described in greater detail in the discussion of FIG. 3A below.

In one embodiment of the invention, the persistent storage (not shown) in the switches (114A-114N) may also include any non-transitory computer readable medium that includes instructions, which, when executed by one or more processors in the switch, enable the switch to perform the functions described in accordance with one or more embodiments of the invention.

In one embodiment of the invention, the network device database (106) is a database for storing network device (e.g., switch) information. A database is a collection of information that is organized in a manner that allows entities that require the information in the collection to access it. In one embodiment of the invention, the network device database resides in one or more computing devices capable of operating as a server. A server may include any type of system (e.g., software and computer hardware) that is configured to generate, send, receive, and/or process requests and replies either locally or over a network using software and computer hardware. The server may include one or more processors, memory, and one or more physical network interfaces. Examples of types of servers include, but are not limited to, database servers (e.g., servers for databases such as the network device database (106)), DHCP servers, application servers, file servers, print servers, and mail servers. The network device database (106) is discussed in greater detail in the discussion of FIG. 3A below.

In one embodiment of the invention, the defect database (104) is a database for storing defect information (not shown). In one embodiment of the invention, defect information includes defect identification information, defect details information, network device criteria, and solution information. In one embodiment of the invention, the defect database resides in one or more computing devices capable of operating as a server. The defect database (104) and defect information are discussed in greater detail in the discussion of FIG. 3B below. In one embodiment of the invention, the network device database (106) and the defect database (104) reside on the same server. In other embodiments of the invention they reside on separate servers.

Continuing with the discussion of FIG. 1, in one embodiment of the invention the defect database (104) and the network device database (106) are operatively connected to the monitoring module (102). In one embodiment of the invention, the monitoring module (102) is a computing device. As used in this document, the term "computing device" refers to any system capable of electronically processing information. Some non-limiting examples of computing devices include servers, client computers, desktop computers, laptop computers, netbook computers, tablets, e-book readers, personal digital assistants (PDAs), remote terminals, cellular phones, and smart phones. In one embodiment of the invention, the monitoring module includes functionality to receive switch information from the switches (114A-114N) and defect information from the switch vendor, and to send the switch information to the network device database (106) and the defect information to the defect database (104). In one embodiment of the invention, the monitoring module (102) also includes functionality to analyze the defect information in the defect database (104) and the switch information in the network device database (106) to determine if any of the defects corresponding to the defect information in the defect database (104) potentially affect any of the switches (114A-114N) corresponding to the switch information in the network device database (106). In one embodiment of the invention, the monitoring module (102) includes functionality to identify the end-user that acquired the switch, to generate an alert that the defect potentially affects one or more of the end-user's switches (114A-114N), and to send the alert to a defect alert recipient (112). The functionality of the monitoring module is described in further detail in the discussion of FIG. 5A below.

In one embodiment of the invention, the defect alert recipient (112) is a computing device in the end-user system (108) and includes functionality to receive alerts from the monitoring module (102). In one embodiment of the invention, an alert includes information that enables the end-user to identify what switches (114A-114N) in the network (110) are potentially affected by a defect and review solution information to allow the end-user to resolve or avoid the defect. In one or more embodiments of the invention, the monitoring module (102) is configured to send the alert in response to a request from the end-user, on a regular schedule, when new defect information becomes available in the defect database (104) related to defects that may affect the switches (114A-114N), or a combination thereof. In one or more embodiments of the invention, the monitoring module is configured to send the alert via a variety of communication methods including, but not limited to, email, phone call, text message, and instant message.

In one embodiment of the invention, in addition to sending the alert to the defect alert recipient (112), the monitoring module may include functionality to automatically initiate the solution on the switches (114A-114N) that are affected by the defect. In another embodiment of the invention, the monitoring module includes functionality to request permission from the end-user before automatically initiating the implementation of the solution that resolves the defect.

The invention is not limited to the system configuration shown in FIG. 1.

Figure 2:
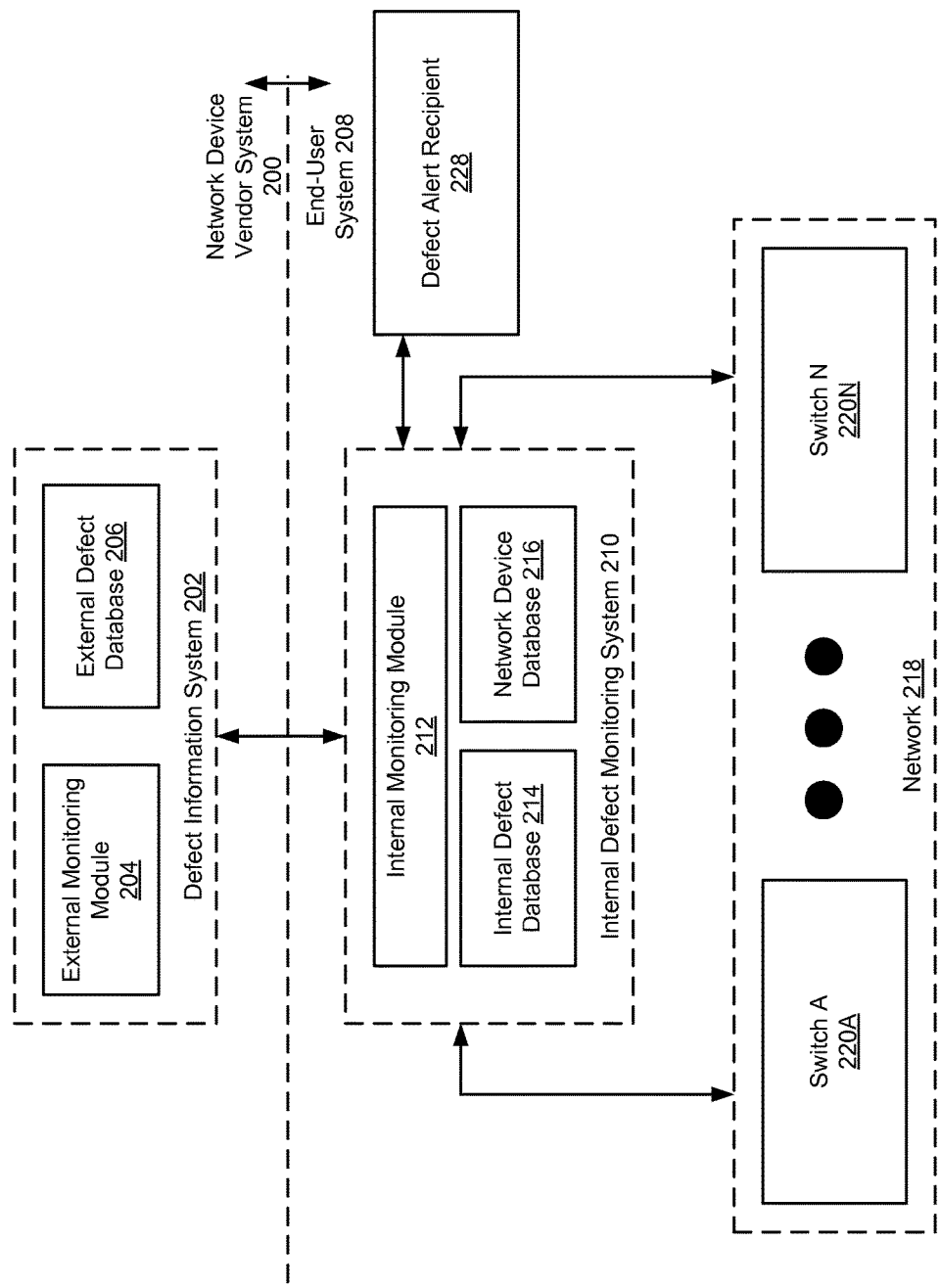
FIG. 2 shows a system in accordance with one or more embodiments of the invention.

FIG. 2 shows a system in accordance with one or more embodiments of the invention. In one embodiment of the invention, the system shown in FIG. 2 differs from the system shown in FIG. 1, at least, in the placement of the module that monitors the switches of the end-user. In FIG. 2, said module resides with the end-user rather than the network device vendor. In one embodiment of the invention, this location allows the end-user to retain the network device (e.g., switch) information rather than send it to the network device vendor. More detail about the system in FIG. 2 may be found in the discussion of FIG. 6 below.

In one embodiment of the invention, the system includes a network device vendor system (200) and an end-user system. The network device vendor system (200) may include a defect information system (202), an external monitoring module (204), and an external defect database (206). The end-user system may include an internal defect monitoring system (210), a network (218), and a defect alert recipient (228). The internal defect monitoring system (210) may include an internal monitoring module (212), an internal defect database (214), and a network device database (216). The network (218) may include switches (220A-220N). Each of these components is described below.

In one embodiment of the invention, the external defect database (206) is substantially similar to the defect database (104) in FIG. 1. In one embodiment of the invention, the external defect database (206) is operatively connected to the external monitoring module (204). The external monitoring module (204) may be a computing device. In one embodiment of the invention, the external monitoring module (204) includes functionality to receive defect information from the network device vendor and send it to the external defect database. In one embodiment of the invention, the external monitoring module (204) is operatively connected to the internal monitoring module (212) of the internal defect monitoring system (210) and includes functionality to send defect information stored in the external defect database (206) to the internal monitoring module. In one or more embodiments of the invention, the external monitoring module is configured to send the defect information in response to a request from the end-user (i.e., pull-based transfer), on a regular schedule (i.e., push-based transfer), when new defect information becomes available in the defect database (206), or a combination thereof. In one or more embodiments of the invention the external monitoring module is configured to send the defect information in the external defect database (204) to the internal defect monitoring system (210) using a variety of information transfer methods including, but not limited to, email, hypertext transport protocol (HTTP), HTTP secure (HTTPS), file transfer protocol (FTP), rsync, bit torrent, secure copy (SCP), and secure shell file transfer protocol (SFTP).

In one embodiment of the invention, the network device database (216) of the internal defect monitoring system (210) is substantially similar to the network device database (106) in FIG. 1 and the internal defect database (214) is substantially similar to the defect database (104) in FIG. 1. In one embodiment of the invention, both the internal defect database (214) and the network device database (216) are operatively connected to the internal monitoring module.

In one embodiment of the invention, the internal monitoring module (212) is operatively connected to the external monitoring module (204), the switches (220A-220N) of the network (218), and the defect alert recipient (228). In one embodiment of the invention, the network (218) is substantially similar to the network (110) in FIG. 1 and the switches (220A-220N) are substantially similar to the switches (114A-114N) in FIG. 1.

In one embodiment the internal monitoring module (212) is a computing device. In one embodiment of the invention, the internal monitoring module (212) includes functionality to receive switch information from the switches (220A-220N) and defect information from the external monitoring module (202) of the defect information system (202), and also includes functionality to send the switch information to the network device database (216) and the defect information to the internal defect database (214). The internal monitoring module (212) also includes functionality to analyze the defect information in the internal defect database (214) and the switch information in the network device database (216) to determine if any of the defects corresponding to the defect information in the internal defect database (214) potentially affect any of the switches (220A-220N) corresponding to the switch information in the network device database (216).

In one embodiment of the invention, the internal monitoring module (212) includes functionality to identify the end-user that acquired the switch, to generate an alert that the defect potentially affects one or more of the end-user's switches (220A-220N), and to send the alert to a defect alert recipient (228). In one embodiment of the invention, the defect alert recipient (228) is substantially similar to the defect alert recipient (112) in FIG. 1. In one embodiment of the invention, an alert includes information that enables the end-user to identify what switches (220A-220N) in the network (218) are potentially affected by a defect as well as solution information to allow the end-user to resolve or avoid the defect. The internal monitoring module (212) is configured to send the alert in response to a request from the end-user, on a regular schedule, when new defect information becomes available in the internal defect database (212) or any combination thereof. In one or more embodiments of the invention, the monitoring module is be configured to send the alert via a variety of communication methods including, but not limited to, email, phone call, text message, and instant message.

In one embodiment of the invention, in addition to sending the alert to the defect alert recipient (228), the internal monitoring module (212) may include functionality to automatically initiate the solution on the switches (220A-220N) that are affected by the defect. In another embodiment of the invention, the monitoring module includes functionality to request permission from the end-user before automatically initiating the implementation of the solution that resolves the defect.

The invention is not limited to the system configuration shown in FIG. 2.

Figure 3A:
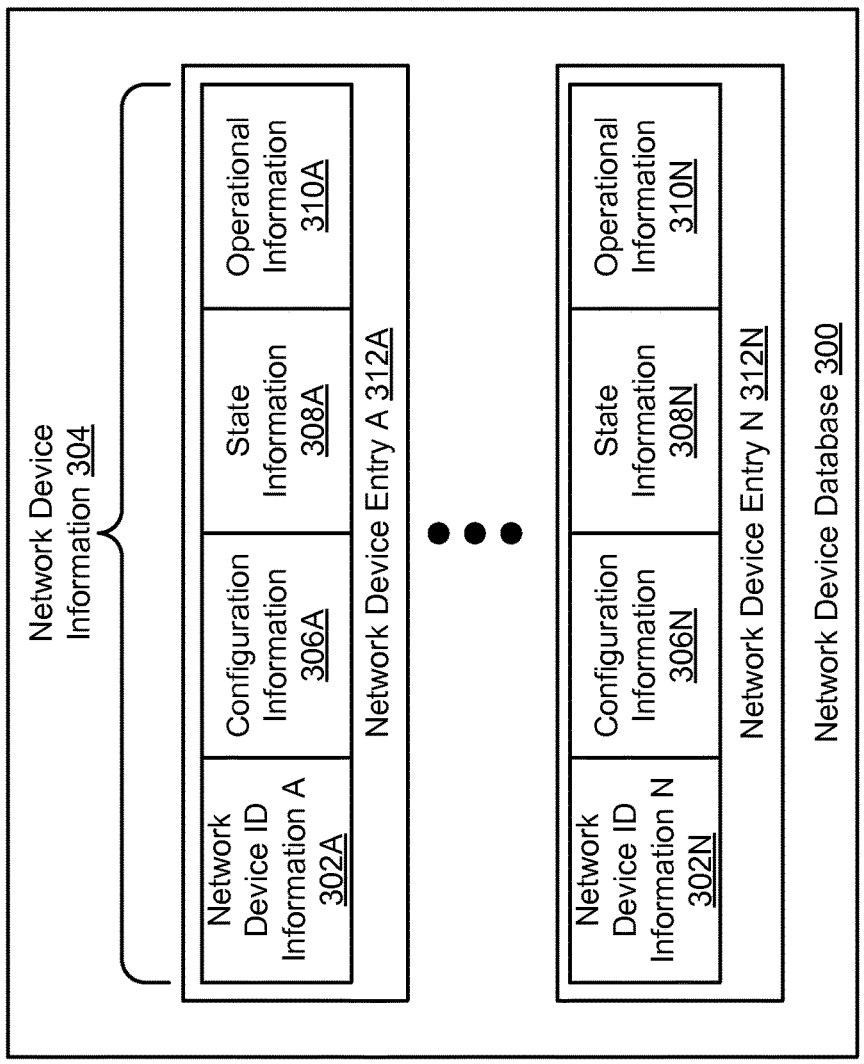
FIG. 3A shows a network device database in accordance with one or more embodiments of the invention.

FIG. 3A shows a network device database in accordance with one or more embodiments of the invention. In one embodiment of the invention, the network device database (300) includes network device entries (312A-312N). A network device entry may include network device identification (ID) information (302A-302N), configuration information (306A-306N), state information (308A-308N), and operational information (310A-310N). The information in a network device entry may be referred to as network device information (304). Each of these components is described below.

In one embodiment, the network device database (300) resides on a server and includes functionality to store network device information (304) in one or more network device entries (312A-312N). In one embodiment of the invention, the network device database (300) includes functionality to allow computing devices to access the network device information (304) in the network device entries (312A-312N).

In one embodiment of the invention, network device ID information (302A-302N) includes information that uniquely identifies a network device in the network. The network device ID information may include product name, model number, serial number, any other information that uniquely identifies the network device, or any combination thereof. In one embodiment of the invention, configuration information (306A-306N) includes, but is not limited to, hardware version information and software version information for the network device. In one embodiment of the invention, state information (308A-308N) includes, but is not limited to, enabled routing algorithm, the number of routing table entries maintained by the network device, the number of Internet Gateway Protocol (IGP) peers of the network device, the number of configured virtual local area networks (VLAN) on a network device, security settings information, the number of MAC addresses in the MAC address table of the network device, and information about capabilities enabled on the network device. In one embodiment of the invention, operational information (310A-310N) includes, but is not limited to, information on the number of times commands have been executed, information about processes that have run and/or are running on the network device, information about the amount of time the network device has been up (i.e., powered on, configured, and performing network related activities), information related to the operating temperature of the network device, information about the quantity and distribution among ports of packets sent to and from the network device, and information about the number of packets dropped by the network device.

In one or more embodiments of the invention, the network devices referred to in FIG. 3A are switches such as the switches (114A-114N) seen in FIG. 1 and the information in a network device entry (312A-312N) is switch information. In other embodiments of the invention, the network devices whose information is stored in the network device database (300) may be switches, routers, other devices that facilitate network operation, or a combination thereof.

The invention is not limited to the network device database configuration shown in FIG. 3A.

Figure 3B:
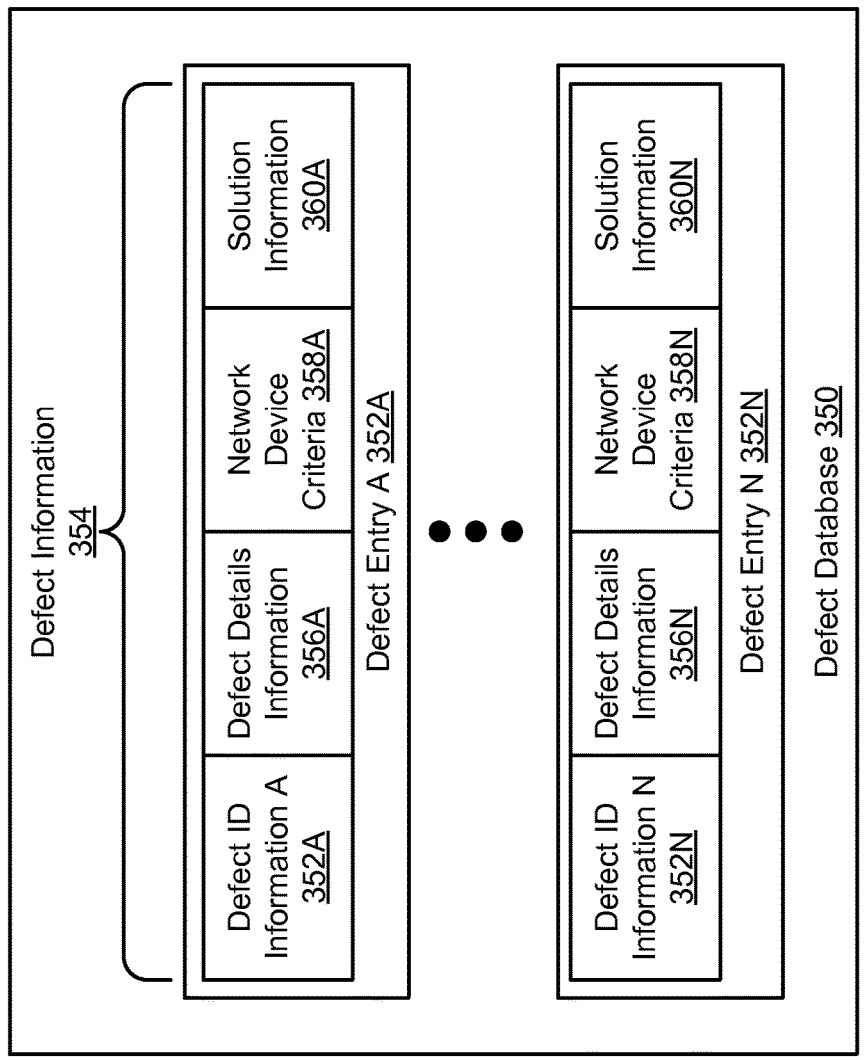
FIG. 3B shows a defect database in accordance with one or more embodiments of the invention.

FIG. 3B shows a defect database in accordance with one or more embodiments of the invention. In one embodiment of the invention, the defect database (350) includes defect entries (352A-352N). A defect entry may include defect identification (ID) information (352A-352N), defect details information (356A-356N), network device criteria (358A-358N), and solution information (360A-360N). The various types of information in a defect entry may be collectively referred to as defect information (354). Each of these components is described below.

In one embodiment, the defect database (360) resides on a server and includes functionality to store defect information (354) in one or more defect entries (352A-352N). A defect is an attribute or property of a product that hinders or prevents a product from performing its intended function. In one embodiment of the invention, the defect database (350) includes functionality to allow computing devices to access the defect information (354) in the defect entries (352A-352N).

In one embodiment of the invention, defect ID information (352A-352N) includes information that uniquely identifies the defect. For example, the network device vendor may use a defect tracking system that assigns an identifying character string to the defect when it is entered into the system.

In one embodiment of the invention, defect details information (356A-356N) includes, but is not limited to, a description of the symptoms seen by network devices (such as switches (114A-114N) in FIG. 1) affected by the defect, the date the defect was reported, screenshots that depict the defect, hyperlinks to pertinent documents or information related to the defect, and a sequence of events that might lead to the defect. Network device criteria (358A-358N) may include, but is not limited to, network device product names, network device model numbers, software versions, and hardware versions. Network device criteria (358A-358N) may also include information pertaining to the state or operation of the network device that is a prerequisite for being affected by the defect. In one embodiment of the invention, solution information includes procedures that can be implemented to resolve or avoid the defect, information about hardware or software that includes a solution to the defect, information about how to obtain such hardware and/or software, steps that can be taken to deploy the hardware and/or software, and changes that can be made to existing software and/or hardware to resolve the defect.

The invention is not limited to the defect database configuration shown in FIG. 3B.

Figure 4:
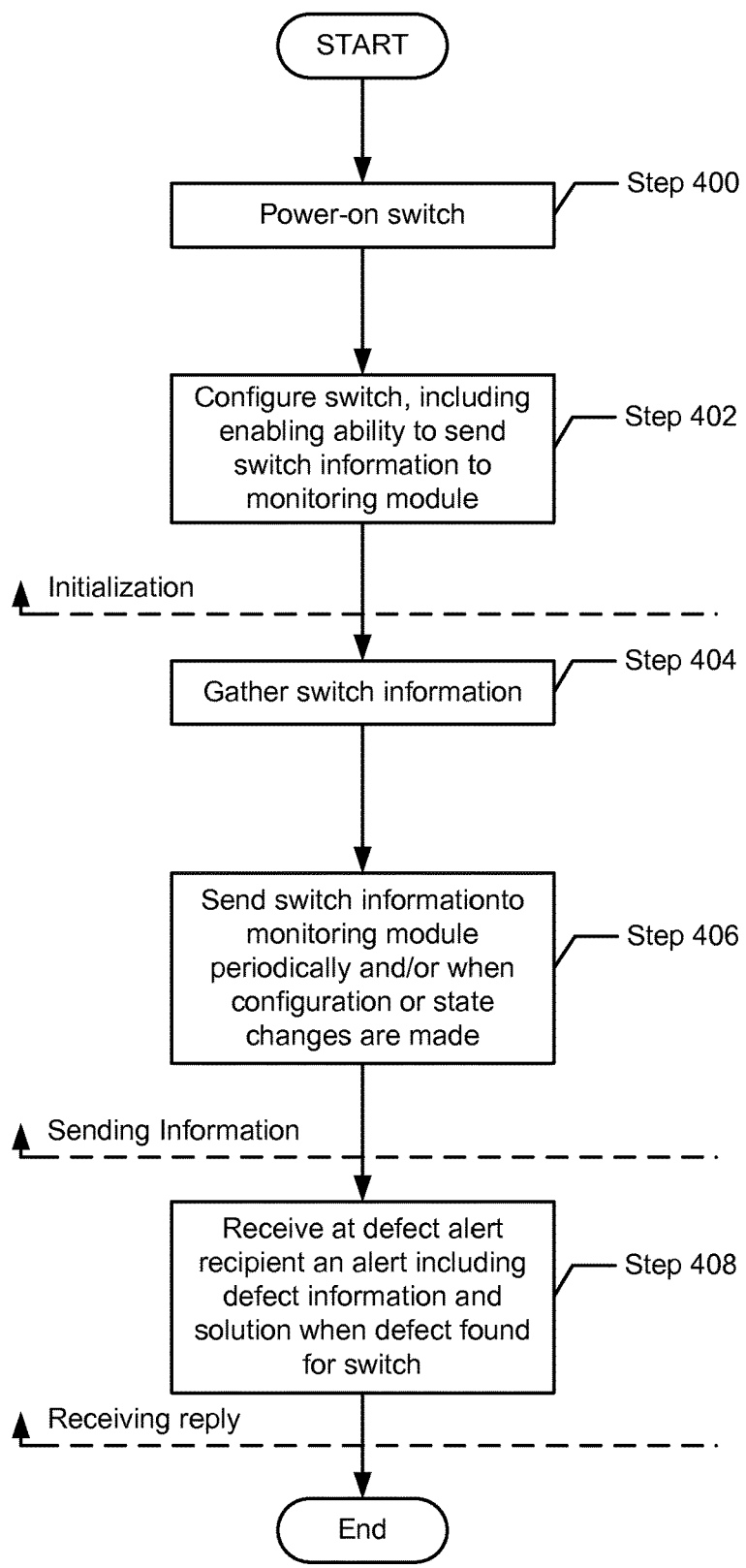
FIGS. 4-6 show flowcharts in accordance with one or more embodiments of the invention.
Figure 5A:
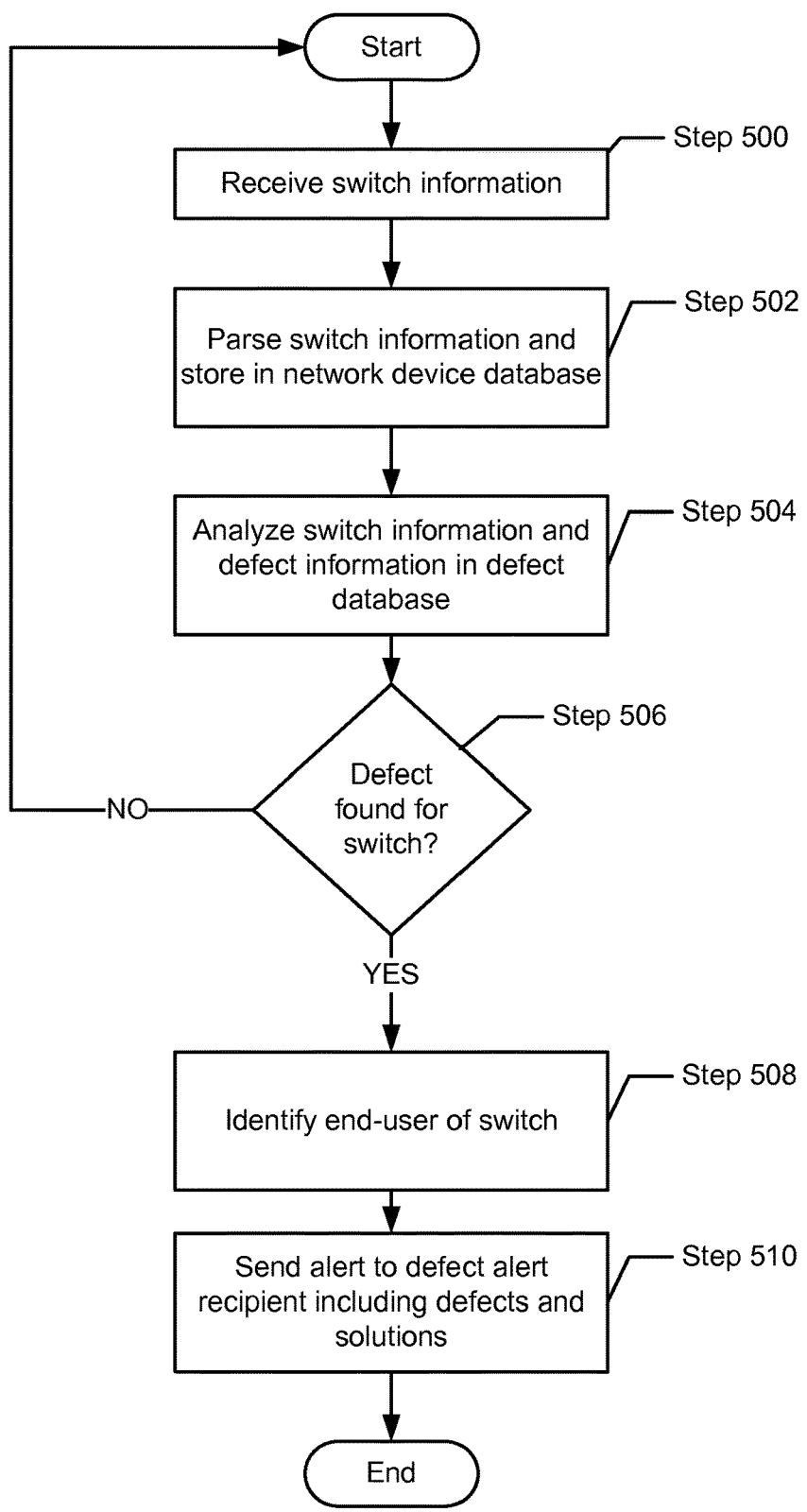
Figure 5B:
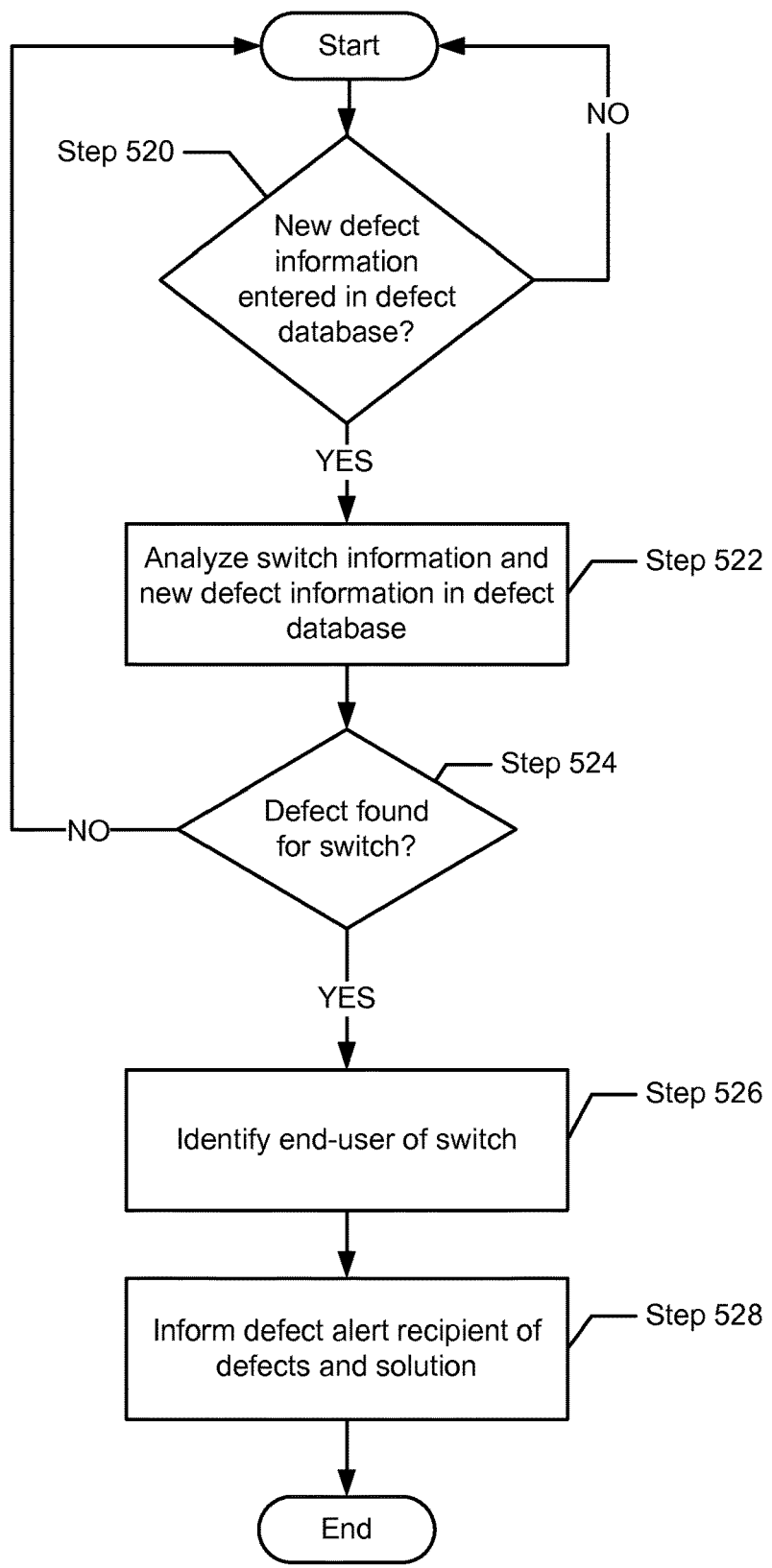
Figure 6:
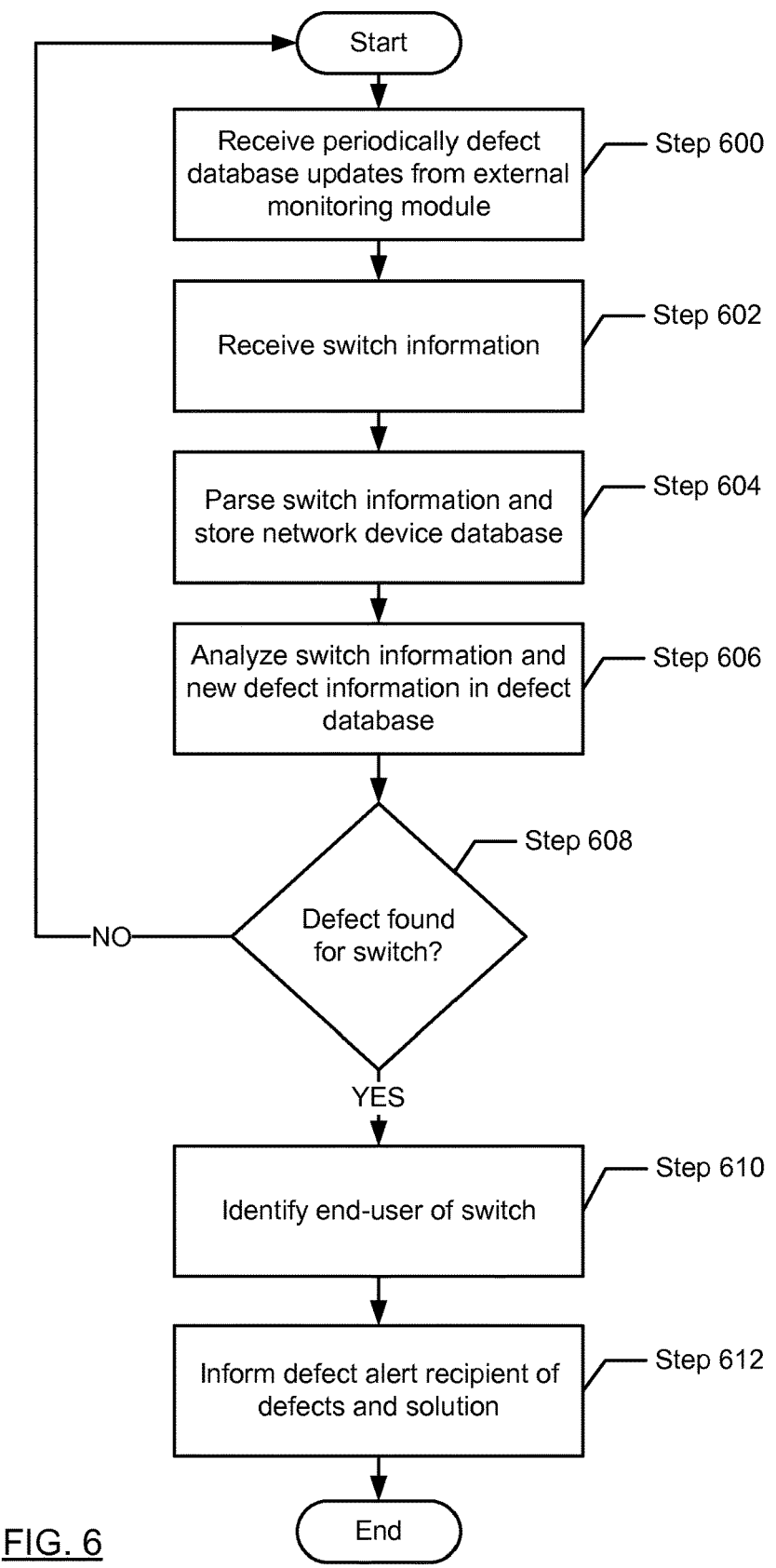

FIGS. 4-6 show flowcharts in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel. In one embodiment of the invention, the steps shown in FIGS. 4-6 may be performed in parallel with any other steps shown in FIGS. 4-6 without departing from the invention.

Turning to FIG. 4, FIG. 4 shows a flowchart that describes a method for sending switch information to a monitoring module and receiving at a defect alert recipient defect information and solution information. In Step 400, the switch (e.g., 114A-114N in FIG. 1) is powered on. One skilled in the art will recognize that although a switch is used as the network device in this figure, other network devices, such as routers, could be used instead. In Step 402 the switch is configured, including enabling the ability to send switch information to a monitoring module. For example, configuration may include making selections regarding which protocols to enable, such as Open Shortest Path First (OSPF). A network device with OSPF enabled will gather link state information from other network devices to build a network topology that is stored in a routing table. In one embodiment of the invention, such as the embodiment in FIG. 1, the switch sends the switch information to a monitoring module at a network device vendor. In another embodiment, such as the embodiment in FIG. 2, the switch sends the switch information to an internal monitoring module in an end-user system.

In Step 404, the switch gathers switch information. In one embodiment of the invention, gathering the switch information includes gathering state information, configuration information, operational information, and identification information as well as storing the switch information in the persistent storage of the switch. For example, state information such as the fact that OSPF is enabled and the current state of the routing table may be gathered.

In Step 406, the switch sends the switch information to the monitoring module. In one embodiment of the invention, the switch information is sent as packets over a network. In one embodiment of the invention, switch information is sent periodically and/or when configuration information or state information changes.

In Step 408, the defect alert recipient of the end-user system receives an alert from the monitoring module. In one embodiment of the invention, the alert includes information about switches in the end-user system that are potentially affected by a defect. For example, the alert may inform the end-user that there is a defect that affects switches of the model they possess that have OSPF enabled and more than 5000 entries in the routing table.

FIG. 5A shows a flowchart describing a method for alerting an end-user that an existing defect in a defect database potentially affects one or more of their switches. In one embodiment of the invention, the method shown in FIG. 5A describes steps that may be performed between steps 406 and 408 in FIG. 4.

In Step 500, a monitoring module receives switch information (i.e., network device information 304 in FIG. 3). In Step 502, the monitoring module parses the switch information and sends it to the network device database. Parsing information is the process of syntactically analyzing a string of symbols that describe the information. In one embodiment of the invention, the parsing of the switch information prepares it to be entered as a network device entry in the network device database.

In Step 504, the monitoring module analyzes the switch information in the network device database and the defect information in the defect database. In Step 506, the monitoring module determines whether or not any of the defects corresponding to the defect information potentially affect any of the switches corresponding to the switch information. In one embodiment of the invention, analyzing the switch information and the defect information and determining if a switch is affected by a defect includes examining the network device criteria of the defect information and comparing it with the switch information to determine if the switch corresponding to the switch information is potentially affected by the defect corresponding to the defect information that includes the switch criteria If no defects are found to apply to any switches, the monitoring module waits to receive more switch information and repeats the process when the switch information arrives. If a one or more defects are found to potentially affect one or more switches, the process moves to Step 508.

In Step 508, the monitoring module identifies the end-user of the switch that is potentially affected by the defect. In one embodiment of the invention, identifying the end-user is accomplished by comparing the switch serial number of the network device ID information with an end-user database that keeps track of all network device serial numbers that the end-user registers with the network device vendor. For example, switch may have a serial number corresponds to end-user A, who purchased the switch from the network device vendor and then registered the switch, providing the serial number of the purchased switch and contact information such as email addresses, phone numbers, etc.

In Step 510, the monitoring module sends an alert to the defect alert recipient of the end-user that includes defect information and solution information relating to the one or more defects that potentially affect one or more switches of the end-user In one embodiment of the invention, the monitoring module, in addition to sending an alert, takes the steps necessary to apply the solution. In one embodiment of the invention, the monitoring module asks the end-user for permission before applying the solution. In one embodiment of the solution, applying the solution includes adjusting the configuration information of the switch. For example, applying the solution may include remotely updating the firmware and/or software running on the switch FIG. 5B shows a flowchart describing a method for alerting an end-user that a new defect entered into a defect database potentially affects one or more of their switches. In one embodiment of the invention, the method shown in FIG. 5A describes steps that may be performed between steps 406 and 408 in FIG. 4

In Step 520, the monitoring module checks whether a new defect has been entered in the defect database. If not, the monitoring module waits and then checks again periodically. If a new defect has been entered, the process moves on to Step 522. In one embodiment of the invention, the new defect may be provided to the monitoring module by the network device vendor.

In Step 522, the monitoring module analyzes the switch information in the network device database and the new defect information in the defect database. In Step 524, the monitoring module determines whether or not any of the new defects corresponding to the new defect information potentially affect any of the switches corresponding to the switch information. In one embodiment of the invention, analyzing the switch information and the new defect information and determining if a switch is affected by a new defect includes examining the network device criteria of the new defect information and comparing it with the switch information to determine if the switch corresponding to the switch information is potentially affected by the new defect corresponding to the new defect information that includes the network device criteria. If no new defects are found to apply to any switches, the monitoring module waits to receive more switch information and repeats the process when the switch information arrives. If a one or more new defects are found to potentially affect one or more switches, the process moves to Step 526.

In Step 526, the monitoring module identifies the end-user of the switch that is potentially affected by the defect. In one embodiment of the invention, identifying the end-user is accomplished by comparing the switch serial number if the switch ID information with an end-user database that keeps track of all network device serial numbers that the end-user registers with the network device vendor.

In Step 528, the monitoring module sends an alert to the defect alert recipient of the end-user that includes defect information and solution information relating to the one or more defects that potentially affect one or more switches of the end-user.

FIG. 6 shows a flowchart describing a method for alerting an end-user that a defect entered into a defect database potentially affects one or more of their switches. In one embodiment of the invention, the method of FIG. 6 corresponds to the system embodiment described in the discussion of FIG. 2 above. In one embodiment of the invention, the method shown in FIG. 6 describes steps that may be performed between steps 406 and 408 in FIG. 4. In one embodiment of the invention, the method of FIG. 6 includes switches sending their switch information to an internal defect monitoring system, which eliminates the need to share the switch information with the network device vendor.

In Step 600, the internal monitoring module (described in discussion of FIG. 2) receives from the external monitoring module (described in discussion of FIG. 2) periodic updates that include defects from the external defect database.

In Step 602, a monitoring module receives switch information. In Step 604, the monitoring module parses the switch information and sends it to the network device database. In Step 606 the monitoring module analyzes the switch information in the network device database and the defect information in the defect database.

In Step 608, the monitoring module determines whether any of the defects corresponding to the defect information potentially affect any of the switches corresponding to the switch information. In one embodiment of the invention, analyzing the switch information and the defect information and determining if a switch is affected by a defect includes examining the network device criteria of the defect information and comparing it with the switch information to determine if the switch corresponding to the switch information is potentially affected by the defect corresponding to the defect information that includes the network device criteria. If no defects are found to apply to any switches, the monitoring module waits to receive more switch information and repeats the process when the switch information arrives. If one or more defects are found to potentially affect one or more switches, the process moves to Step 610.

In Step 610, the monitoring module identifies the end-user of the switch that is potentially affected by the defect. In one embodiment of the invention, identifying the end-user is accomplished by comparing the switch serial number of the switch ID information with an end-user database that keeps track of all network device serial numbers that the end-user registers with the network device vendor.

In Step 612, the monitoring module sends an alert to the defect alert recipient of the end-user that includes defect information and solution information relating to the one or more defects that potentially affect one or more switches of the end-user.

Figure 7:
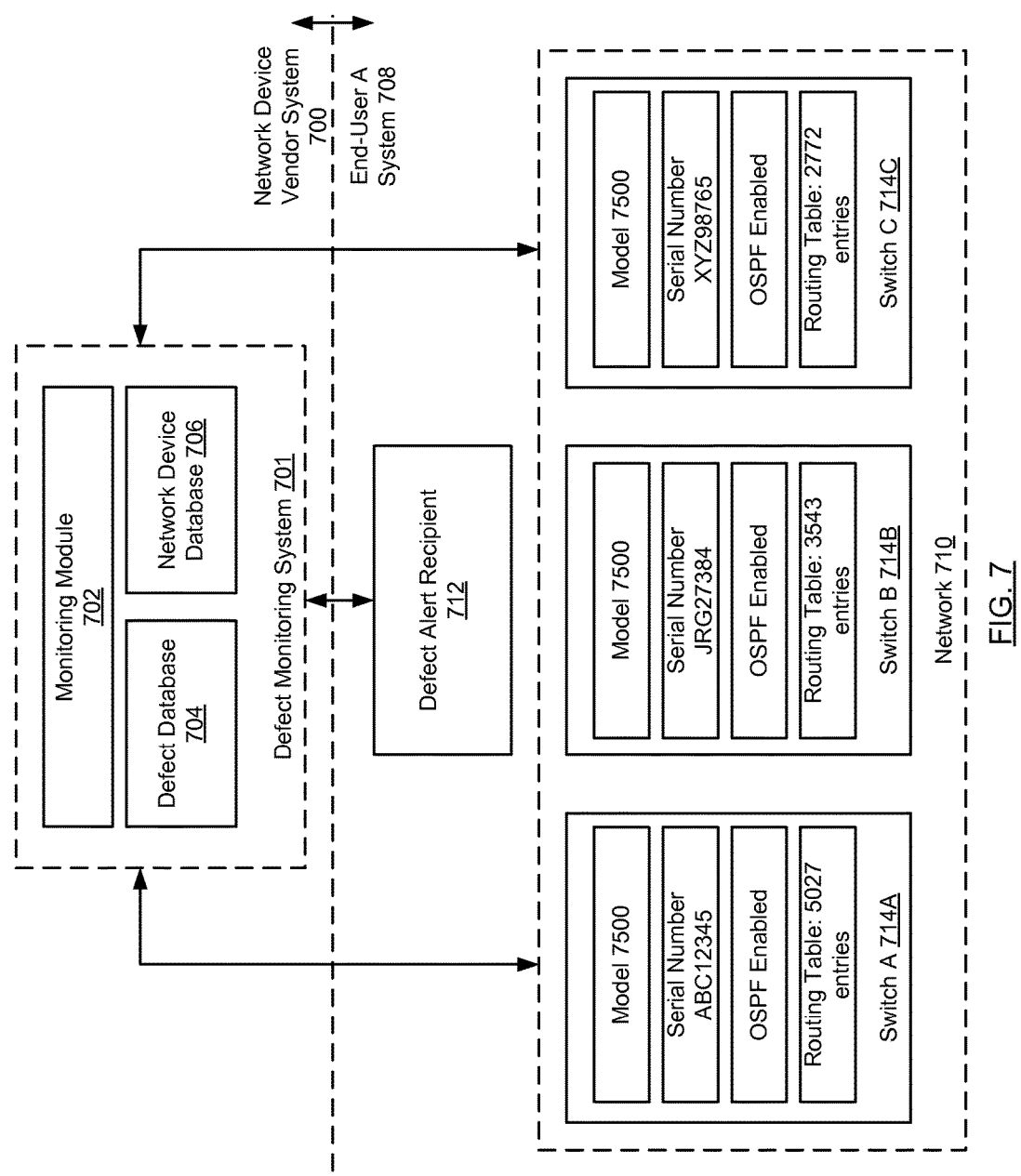
FIG. 7 shows an example in accordance with one embodiment of the invention.

FIG. 7 shows an example in accordance with one or more embodiments of the invention. The example is not intended to limit the scope of the invention.

Referring to FIG. 7, consider the scenario in which an end-user system (708) includes a network with three switches (714A, 714B, and 714C) in the network (710). Switch A (714A) is a Model 7500 switch with a serial number ABC12345 that has OSPF enabled and 5027 entries in its routing table. Switch B (714B) is a Model 7500 switch with a serial number JRG27384 that has OSPF enabled and that has 3543 entries in its routing table. Switch C (714A) is a Model 7500 switch with a serial number XYZ98765 that has OSPF enabled and that has 2772 entries in its routing table.

The three switches are configured to send switch information to the defect monitoring system (701) of the network device vendor system (700) once a day. The monitoring module (702) of the defect monitoring system (701) will parse the switch information from the three switches (714A, 714B, and 714C) and create three network device entries in the network device database (706). The network device entries will include the model of the switch and its serial number in the network device ID information portion of the network device entry. The network device entries will also include the number of entries in the routing table and the fact that OSPF is enabled in the state information portion of the network device entry.

Assume a test engineer (not shown) and the network device vendor has previously discovered that Model 7500 switches and Model 7100 switches that have more than 5000 entries in their routing table will begin to drop twenty-five percent of the packets they receive. The test engineer, at the time he discovered this defect, entered this as a defect as defect number 546213 in the defect tracking system (not shown) of the network device vendor. His entry will, at least, include the two model numbers (7100 and 7500) that experience the defect and that the switch must have more than 5000 entries in its routing table. The defect tracking system stores the defects entered as defect entries in the defect database (704). The information about the model numbers and the threshold of entries in the routing table will be stored, at least, in the network device criteria portion of the defect entry. The network vendor then works to determine a solution that will correct the defect. The solution the network device vendor discovers to correct the defect is to either reduce the number of entries in the routing table to fewer than 5000 or to apply a new firmware to the switch that contains code corrections that eliminate the defect. However, the firmware has not been fully tested or publicly released by the network device vendor on the day the switches (714A, 714B, and 714C) send the switch information to the defect monitoring system (701).

The monitoring module (702), after receiving the switch information sent by the switches (714A, 714B, and 714C) and entering it as network device entries in the network device database (706), analyzes the network device entries to determine if the information for any of the switches (714A, 714B, and 714C) matches the network device criteria in any of the defect entries in the defect database (704). The monitoring module (702) in this example discovers that the network device entry for Switch A (714A) includes Model 7500 in the network device ID information along with OSPF enabled and 5027 entries in the routing table in the state information. This matches the network device criteria in the defect entry for defect number 546213, which includes Model 7100 and Model 7500 and over 5000 entries in the routing table.

Having discovered that Switch A (714A) is affected by defect 546213 the monitoring module (702) checks the end-user information database (not shown) to determine the contact information for the end-user that registered a switch with serial number ABC12345. The monitoring module discovers that the end-user has an email address specified as its defect alert recipient (712). The monitoring module then generates and sends an email to the email address that alerts the end-user that Switch A (714A) may be affected by defect 546213. The email includes defect details information, how to determine if the defect is occurring on Switch A (714A), and solution information to correct the defect. In this example, the solution information includes commands that can be entered into the command line interface of Switch A (714A) to remove entries from the routing table and to limit the size of the routing table to 4999 entries. The solution information also includes information about the expected release date of the firmware that will resolve the problem and allow the end-user to have more than 5000 entries in the routing table of Switch A without dropping twenty-five percent of the packets it receives. The end-user then chooses to implement the suggested solution.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining that a defect applies to a network device, comprising:

receiving, at a monitoring module comprising a computing device and before the defect occurs on the network device, network device information from the network device, wherein the network device information comprises state information and operational information for the network device, wherein the state information does not comprise hardware and software version information, and wherein the operational information comprises information about how the network device has operated;

storing, in a network device database, the network device information from the network device;

receiving, at the monitoring module, defect information about the defect, wherein the defect information comprises network device criteria specifying what state information and operational information are required for the network device to be potentially affected by the defect, and wherein the defect comprises a condition that, if occurring, prevents normal operation of the network device;

storing the defect information in a defect database;

making a determination that the defect potentially applies to the network device by:

analyzing the network device information to obtain the state information and the operational information;

analyzing the defect information to determine that the defect has previously occurred on a plurality of other network devices;

comparing the network device criteria to the state information to diagnose that the state of the network device is similar to the states of each of the plurality of other network devices at the time the defect occurred on each of the plurality of other network devices; and comparing the network device criteria to the operational information to diagnose that the network device has been operated similarly to each of the plurality of other network devices before the defect occurred on each of the plurality of other network devices; and based on the determination, informing a defect alert recipient that the defect potentially applies to the network device.

2. The method of claim 1, wherein the network device information further comprises network device identification (ID) information that uniquely identifies the network device, and configuration information that specifies a hardware version of hardware in the network device and a software version of software executing on the network device.

3. The method of claim 1, wherein the operational information comprises commands executed on the network device.

4. The method of claim 3, wherein comparing the network device criteria to the operational information to diagnose that the network device has been operated similarly to each of the plurality of other network devices before the defect occurred on each of the plurality of other network devices have been operated comprises determining that the defect potentially applies to the network device by comparing the network device criteria to the commands executed on the network device to determine that the commands executed on the network device are similar to the commands executed on each of the plurality of other network devices before the defect occurred on each of the plurality of other network devices.

5. The method of claim 1, wherein the state information comprises a number of routing table entries and a number of Internet Gateway Protocol (IGP) peers.

6. The method of claim 5, wherein comparing the network device criteria to the state information to diagnose that the state of the network device is similar to the states of each of the plurality of other network devices at the time the defect occurred on the plurality of other network devices comprises determining that the defect potentially applies to the network device by comparing the network device criteria to the number of routing table entries to determine that the state of the network device is similar to the state of each of the plurality of other network devices at the time the defect occurred on each of the plurality of other network devices.

7. The method of claim 1, wherein the defect information further comprises defect identification information that uniquely identifies the defect, defect details information, and solution information specifying how to correct the defect.

8. The method of claim 7, wherein informing the defect alert recipient that the defect potentially applies to the network device further comprises:
sending, from the monitoring module, the solution information to the defect alert recipient relating to a solution for the defect, wherein the solution is derived from the solution information.

9. The method of claim 1, further comprising:
executing, automatically, a solution for the defect that potentially applies to the network device.

10. The method of claim 9, further comprising:
obtaining permission from the defect alert recipient before automatically executing the solution for the defect that potentially applies to the network device.

11. A defect monitoring system, comprising:
a defect database comprising a defect entry for a defect, wherein the defect entry comprises defect information, and wherein the defect comprises a condition that, if occurring, prevents normal operation of a network device;
a network device database comprising a network device entry for the network device, wherein the network device entry comprises network device information; and
a monitoring module comprising a computing device and operatively connected to the network device and to a defect alert recipient and configured to:
receive, before the defect occurs on the network device, the network device information from the network device, wherein the network device information comprises state information and operational information for the network device, wherein the state information does not comprise hardware and software version information, and wherein the operational information comprises information about how the network device has operated;
store, in the network device database, the network device information from the network device;
determine that the defect potentially applies to the network device by: analyzing the network device information in the network device database to obtain the state information and the operational information;
analyzing the defect information to obtain network device criteria specifying what state information and operational information are required for the network device to be affected by the defect;
analyzing the defect information to determine that the defect has previously occurred on a plurality of other network devices;
comparing the network device criteria to the state information to diagnose that the state of the network device is similar to the states of each of the plurality of other network devices at the time the defect occurred on each of the plurality of other network devices; and
comparing the network device criteria to the operational information to diagnose that the network device has been operated similarly to each of the plurality of other network devices before the defect occurred on each of the plurality of other network devices; and
based on the determination, inform the defect alert recipient that the defect potentially applies to the network device.

12. The defect monitoring system of claim 11, wherein the monitoring module is further configured to:
receive the defect information about the defect; and
store the defect information in the defect database.

13. The defect monitoring system of claim 11, wherein the network device is one selected from a group consisting of a switch and a router.

14. The defect monitoring system of claim 13, wherein the state information comprises at least one selected from a group consisting of capabilities enabled on the switch and security settings information.

15. The defect monitoring system of claim 11, wherein the network device information further comprises network device identification (ID) information that uniquely identifies the network device, configuration information that specifies a hardware version of hardware in the network device and a software version of software executing on the network device, and the operational information that specifies commands executed on the network device.

16. The defect monitoring system of claim 11, wherein the defect information further comprises defect identification information that uniquely identifies the defect, defect details information, and solution information specifying how to correct the defect.

17. The defect monitoring system of claim 16, wherein the monitoring module is further configured to:
send the solution information to the defect alert recipient relating to a solution for the defect, wherein the solution is derived from the solution information.

18. The defect monitoring system of claim 11, wherein the monitoring module is further configured to execute automatically a solution for the defect that applies to the network device.

19. The defect monitoring system of claim 18, wherein the monitoring module is further configured to obtain permission from the defect alert recipient before automatically executing the solution for the defect that potentially applies to the network device.

20. A non-transitory computer readable medium comprising instructions, which when executed by a processor perform a method, the method comprising:
receiving, at a monitoring module comprising a computing device and before a defect occurs on the network device, network device information from the network device, wherein the network device information comprises state information and operational information for the network device, wherein the state information does not comprise hardware and software version information, and wherein the operational information comprises information about how the network device has operated;

storing, in a network device database, the network device information from the network device;

receiving, at the monitoring module, defect information about the defect, wherein the defect information comprises network device criteria specifying what state information and operational information are required for the network device to be potentially affected by the defect, and wherein the defect is a condition that, if occurring, prevents normal operation of the network device;

storing the defect information in a defect database;

making a determination that the defect potentially applies to the network device by:

analyzing the network device information to obtain the state information and the operational information;

analyzing the defect information to determine that the defect has previously occurred on a plurality of other network devices;

comparing the network device criteria to the state information to diagnose that the states of each of the network device is similar to the state of the plurality of other network devices at the time the defect occurred; and comparing the network device criteria to the operational information to diagnose that the network device has been operated similarly to each of-the plurality of other network devices before the defect occurred on each of the plurality of other network devices; and based on the determination, informing a defect alert recipient that the defect potentially applies to the network device.

21. The non-transitory computer readable medium of claim 20, wherein the network device information further comprises network device identification (ID) information that uniquely identifies the network device, and configuration information that specifies a hardware version of hardware in the network device and a software version of software executing on the network device.

22. The non-transitory computer readable medium of claim 20, wherein the network device information further comprises the operational information that specifies commands executed on the network device.

23. The non-transitory computer readable medium of claim 20, wherein the state information comprises at least one selected from a group consisting of a number of virtual local area networks (VLAN) configured and a number of media access control (MAC) addresses in a MAC address table.

24. The non-transitory computer readable medium of claim 20, wherein the defect information further comprises defect identification information that uniquely identifies the defect, defect details information, and solution information specifying how to correct the defect.

25. The non-transitory computer readable medium of claim 24, wherein informing the defect alert recipient that the defect potentially applies to the network device further comprises:

sending, from the monitoring module, the solution information to the defect alert recipient relating to a solution for the defect, wherein the solution is derived from the solution information.

26. The non-transitory computer readable medium of claim 20, further comprising instructions for executing automatically a solution for the defect that potentially applies to the network device.

27. The non-transitory computer readable medium of claim 26, further comprising instructions for obtaining permission from the defect alert recipient before automatically executing the solution for the defect that potentially applies to the network device.

28. A method for determining that a defect applies to a network device, comprising:

receiving, at an internal monitoring module comprising a computing device and before the defect occurs on the network device, network device information from the network device, wherein the network device information comprises state information and operational information for the network device, wherein the state information does not comprise hardware and software version information, and wherein the operational information comprises information about how the network device has operated;

storing, in a network device database, the network device information from the network device;

receiving, at the internal monitoring module, defect information about the defect, wherein the defect information comprises network device criteria specifying what state information and operational information are required for the network device to be potentially affected by the defect, and wherein the defect is a condition that, if occurring, prevents normal operation of the network device;

storing the defect information in a defect database;

making a determination that the defect potentially applies to the network device by:

analyzing the network device information to obtain the state information and the operational information;

analyzing the defect information to determine that the defect has previously occurred on a plurality of other network devices;

comparing the network device criteria to the state information to diagnose that the state of the network device is similar to the states of each of the plurality of other network devices at the time the defect occurred on the plurality of other network devices; and comparing the network device criteria to the operational information to diagnose that the network device has been operated similarly to each of the plurality of other network devices before the defect occurred on each of the plurality of other network devices have been operated; and based on the determination, informing a defect alert recipient that the defect potentially applies to the network device.

\* \* \* \* \*